United States Patent [19]

Bekefi et al.

[11] Patent Number: 4,530,096
[45] Date of Patent: Jul. 16, 1985

[54] LOWBITRON - A SOURCE OF COHERENT ELECTROMAGNETIC RADIATION

[75] Inventors: George Bekefi, Brookline; Wayne A. McMullin, Belmont, both of Mass.

[73] Assignee: The United States of America as represented by the Secretary of the Navy, Washington, D.C.

[21] Appl. No.: 441,700

[22] Filed: Nov. 15, 1982

[51] Int. Cl.³ .............................................. H01S 3/30
[52] U.S. Cl. .......................................... 372/4; 372/2; 372/37; 315/3.5; 315/3; 315/4; 315/5
[58] Field of Search ................. 372/2, 37, 69, 5; 315/4, 5, 5.35, 3.5, 3

[56] References Cited

U.S. PATENT DOCUMENTS

| | | | |
|---|---|---|---|
| 3,353,053 | 11/1967 | Bott et al. | 313/154 |
| 4,215,291 | 7/1980 | Friedman | 315/4 |
| 4,298,824 | 11/1981 | Walsh | 315/3 |
| 4,331,936 | 5/1982 | Schlesinger et al. | 372/2 |
| 4,392,078 | 7/1983 | Noble et al. | 315/4 |
| 4,466,101 | 8/1984 | Schoen | 372/2 |

OTHER PUBLICATIONS

McMullin et al.; "Coherent Radiation from a Relativistic Electron Beam in a Longitudinal, Periodic Magnetic Field", *Appl. Phys. Lett.*, vol. 39, Nov. 15, 1981, p. 845.
McMullin et al.; "Simulated Emission from Relativistic Electrons Passing Through a Spatially Periodic Long. Mag. Field", *Phys. Rev. A*, vol. 25, No. 4, Apr. 1982.
Davidson et al.; "Higher Harmonic Emission by a Relativistic Electron Beam in a Long. Mag. Wiggler", *Phys. Rev. A* vol. 26, No. 4, Oct. 1982, p. 26.

*Primary Examiner*—William L. Sikes
*Assistant Examiner*—Léon Scott, Jr.
*Attorney, Agent, or Firm*—Robert F. Beers; Arthur A. McGill; Prithvi C. Lall

[57] ABSTRACT

A source of coherent electromagnetic radiation capable of generating or amplifying waves in the centimeter, millimeter, and submillimeter wavelength range. An annular beam of gyrating electrons is produced which is then compressed to its paraxial position by means of a solenoid magnetic field around the wave-guide. This electron beam is also subjected to a transverse motion in an interaction region by a longitudinal rippled (wiggler) magnetic field. Such a field is generated by a periodic assembly of rings magnetized in the axial direction. The electron beam during its accelerated motion generates or amplifies coherent electromagnetic radiation in the centimeter, millimeter, or submillimeter range.

6 Claims, 3 Drawing Figures

LOWBITRON - A SOURCE OF COHERENT ELECTROMAGNETIC RADIATION

BACKGROUND OF THE INVENTION

This invention relates to high powered coherent radiation sources and more particularly to a continuously tunable free electron laser which can generate high power in the centimeter, millimeter, and submillimeter range.

During the past ten years, relativistic electron beams have been used with the view of generating intense coherent electromagnetic radiation having wavelengths in the centimeter, millimeter, and submillimeter ranges. Two main types of electron beam instabilities have been used for this purpose: the cyclotron maser instability characterized by azimuthal and axial electron bunching, and emission frequencies associated with the electron gyrofrequency or one of its harmonics, and the free electron laser instability characterized by axial electron bunching, and emission frequencies associated with the Doppler upshifted period of an imposed, transverse, periodic (wiggler) magnetic field.

Each mechanism has its advantages and disadvantages. The cyclotron maser (gyrotron) has a large instability growth rate and good efficiency. However, it is limited in frequency to the millimeter wavelength range due to technical difficulties of constructing practical tubes with very large magnetic fields. The free electron laser has smaller growth rates and efficiencies and has rigid requirements on beam quality. However, because of the double Doppler upshift experienced by the waves, very high frequencies can be achieved with the free electron laser.

SUMMARY OF THE INVENTION

According to the teachings of the subject invention, the lowbitron—a longitudinal wiggler beam interaction device—is a hybrid system of a cyclotron maser and a free electron laser. A relativistic electron beam in the form of a thin pencil propagates on axis of an evacuated drift tube, which also acts as the waveguide for the electromagnetic radiation. The beam electrons gyrate in the combined, uniform magnetic field of a solenoid, and a longitudinally rippled (wiggler) magnetic field, such that the total imposed magnetic field on the axis is of the form given by $\vec{B} = \hat{z}[B_0 + B_1 \sin(k_0 z)]$ where $B_0$ is the uniform magnetic field, $B_1$ is the amplitude of the longitudinal wiggler magnetic field along z-axis, $k_0$ is equal to $2\pi/l$ is the wavenumber and $l$ is the periodicity of the wiggler. This causes longitudinal periodic magnetic field modulations on the axis as opposed to transverse modulations in the case of free electron lasers. This type of periodic field modulation is advantageous because longitudinal modulations can be more easily produced and at considerably larger amplitudes. In traversing the interaction region, the beam electrons become bunched in the transverse and axial directions and, as a result, a convectively unstable right circularly polarized electromagnetic wave propagates along the guiding magnetic field. This radiation is coupled out of the system by conventional waveguide or quasi-optical techniques.

An object of subject invention is to have a source of high power coherent electromagnetic radiation with wavelength in the millimeter and submillimeter range.

Another object of subject invention is to have a source of electromagnetic radiation source wherein the wiggler magnetic field is longitudinal periodic magnetic field unlike frequently used transverse periodic magnetic field.

Still another object of subject invention is to have a source of electromagnetic radiation wherein the modulation of the transverse orbital velocity in the guiding magnetic field is caused by the presence of longitudinal wiggler magnetic field.

Other objects and novel features of subject invention will become more readily apparent from the following detailed description when taken in conjunction with accompanying drawings wherein like elements are given like reference numerals throughout.

DETAILED DESCRIPTION OF A PREFERRED EMBODIMENT

Figure 1:
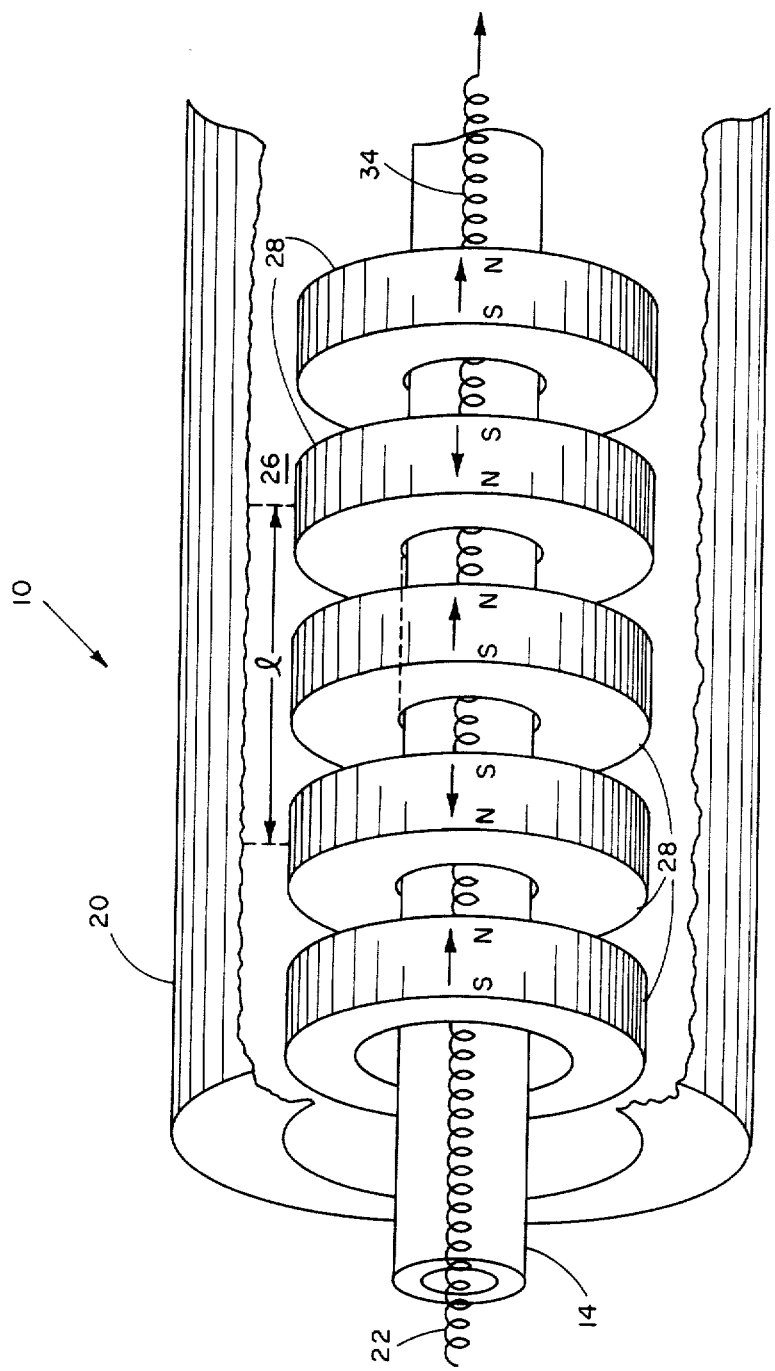
FIG. 1 is a perspective view of a device built according to the teachings of subject invention.
Figure 3:
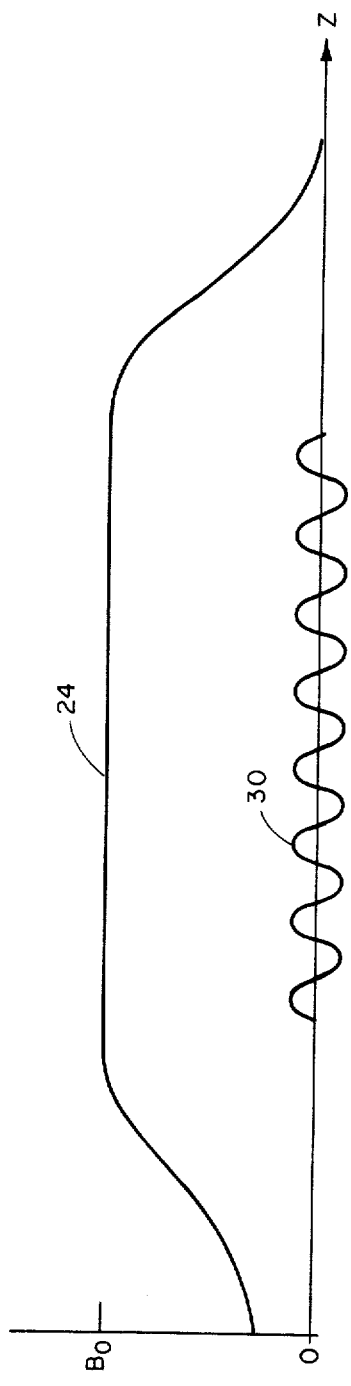
FIG. 3 is a graphical representation of the variation of the solenoid magnetic field and the longitudinal wiggler magnetic field along the direction of motion of the electron beam.
Figure 2:
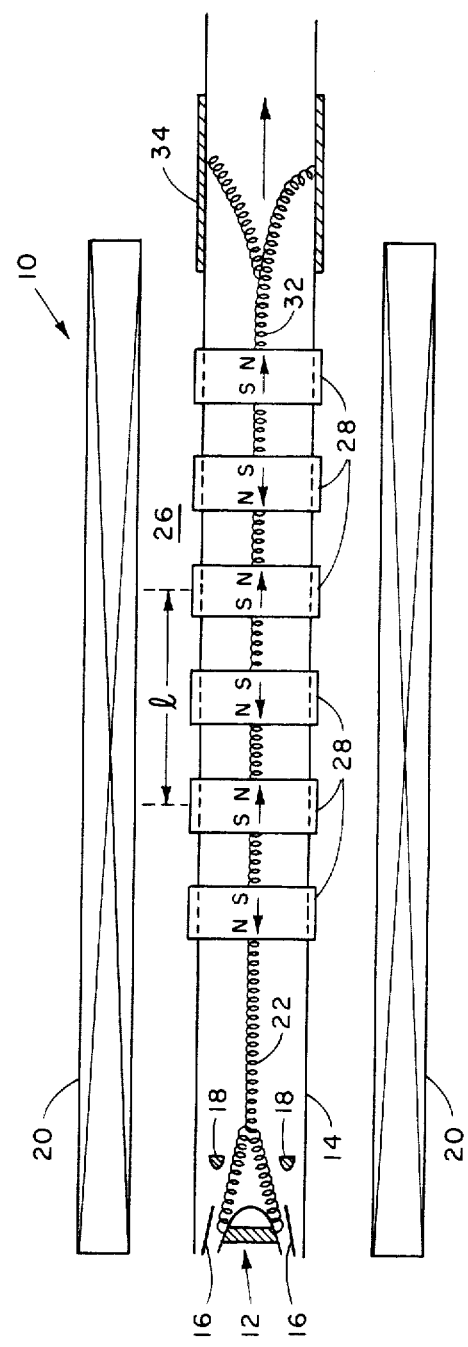
FIG. 2 is a schematic representation of the device.

Subject invention includes apparatus and technique adapted to generate very high power of coherent electromagnetic radiation in the millimeter and submillimeter range which is continuously tunable. A preferred embodiment of the invention to accomplish this objective is schematically and partially in a cross-sectional view is shown in FIGS. 1-3 wherein like elements are given like reference numbers throughout. As shown in FIG. 2, source 10 comprises a relativistic electron beam generator 12 which provides an electron beam with a transverse velocity and an axial velocity projecting into drift tube 14 using electrodes 16 and accelerating plates 18. This can also be accomplished by using an electron gun such as a magnetron injection gun placed in the fringing field of the solenoid as described by S. Ahn et al. editors, "Collection of Papers on the Electron Cyclotron Maser (Gyrotron)" Vol 1, Soviet Papers, Naval Research Laboratory Report, Washington, D.C., NRL Memorandum Report No. 3937, October 1979. This report is incorporated here by reference. The electron beam so obtained has a transverse velocity $v_1$ which it acquires at the magnetron injection gun and yields an annular beam 22, which moves inside drift tube 14. Solenoid 20 surrounding drift tube 14 is used to generate spatially rising solenoidal magnetic field which reaches constant amplitude $B_0$. Spatial variation of the solenoidal magnetic field along the axial direction (z-axis) is represented by curve 24 in FIG. 3. The annular electron beam 22 is then adiabatically compressed to its paraxial position by means of the spatially rising solenoidal magnetic field. Alternatively, one can envision using a magnetically shielded Pierce type of gun in conjunction with transverse magnetic wiggler excitation to impart the necessary $v_1$ to the beam of electrons. The adiabatically compressed electron beam to its paraxial position is then subjected to a longitudinal periodic wiggler magnetic field in interaction region 26. It should be noted that the periodic wiggler magnetic field is longitudinal as opposed to a periodic transversely modulated magnetic field used as the periodic wiggler magnetic field in the prior art such as U.S. Pat. No. 4,331,936 to Schlesinger et al. which is incorporated here by reference. This has the advantage that it leads to a higher amplitude of the periodic wiggler magnetic field and leads to independent radiation amplification which occurs due to modulation of the transverse orbital velocity in the guiding magnetic field due to the presence of periodic (wiggler) longitudinal magnetic field. As a result of the constant solenoidal magnetic field and the longitudinal periodic (wiggler) magnetic field, the imposed magnetic field, $\vec{B}$, in the interaction region 26 on the axis of the drift tube 14 is given by: $\vec{B}=\hat{z}[(B_o+B_1 \sin k_o z)]$—(1) where $B_o$ and $B_1$ are the amplitudes of the solenoidal and longitudinal periodic (wiggler) magnetic fields respectively and $k_o=2\pi/l$ is the wave number and l being the periodicity of the wiggler magnetic field as shown in FIGS. 1 and 2. It should be noted that the longitudinal periodic (wiggler) magnetic field is preferably generated by fabricating a periodic assembly of rings from Samarium-cobalt or some equivalent magnetic material and magnetizing the rings in the axial direction. It should be noted that the longitudinal periodic (wiggler) magnetic field can also be generated either by driving electric current azimuthly in alternate directions through a periodic assembly of copper rings or by using the technique of magnetic diffusion used in pulsed system which is described in a paper by K. D. Jacobs, G. Bekefi and I. R. Freeman, Journal of Applied Physics, Vol. 52, page 4977 (1981) which is incorporated herein by reference. In all the above-mentioned methods of generating the longitudinal periodic (wiggler) magnetic field, the magnetic field at a distance Y from the axis of drift tube 14 is approximately given by:

$$\vec{B}_1 = [\hat{z} B_1 I_o(k_o Y) \sin(k_o z) - \hat{Y} B_1 I_1(k_o Y) \cos(k_o z)] \quad (2)$$

where $I_o$ and $I_1$ are modified Bessel functions. For points near the axis, $k_o Y << 1$ and equation (2) is reduced to $$\vec{B}_1 = \hat{z}(B_1 \sin k_o z) \quad (3)$$

Consequently, the net magnetic field due to $\vec{B}_o$ and $\vec{B}_1$ is given by equation (1) above.

As pointed out earlier, the periodic (wiggler) magnetic field modulation in the device of subject invention is longitudinal rather than transverse, as in the case of free electron lasers (FEL). This is advantageous because longitudinal modulations can be more easily produced and at considerably larger amplitudes.

A graphical representation of the longitudinal periodic (wiggler) magnetic field is shown by Sinusoidal curve 30 FIG. 3.

In traversing the interaction region 26, the gyrating relativistic electrons become bunched in the transverse and axial directions, and as a result a convectively unstable right circularly polarized electromagnetic wave propagates along the guiding magnetic in the Z-direction as shown in FIG. 2. The electromagnetic radiation is coupled out of the system by conventional waveguide or quasioptical technqiues as described in the prior art references cited above and incorporated by reference in subject patent application. As shown schematically in FIG. 2, the spent electron beam 32 is collected on a beam collector 34 located in the fringing solenoidal magnetic field.

The radiation frequency, $\omega$, is found approximately be requiring that the phase velocity, $\omega/k$ (where k is the parallel wave number of the radiation excitation), of the Doppler shifted cyclotron mode excited in the rippled magnetic field given by equation (1) above, $\omega = \Omega_o/\gamma + (k-k_o)v_\parallel$ —(4) equals the phase velocity of an electromagnetic mode of the wave-guide $$k^2 c^2 - \omega^2 - \omega_c^2 \quad (5)$$

where $\omega$ and k are the frequency and parallel wave numbers of the excitation respectively;

$$\Omega_o = \frac{eB_o}{m_o}$$

where ($m_o$ is rest mass of an electron and e is its charge) is the nonrelativistic cyclotron frequency in the guiding magnetic field;

$$\gamma = (1 - \beta_\parallel^2 - \beta_\perp^2)^{-\frac{1}{2}} = \left(1 + \frac{eV}{m_o c^2}\right)$$

with V as the beam voltage;

$$\beta_\parallel = \frac{v_\parallel}{c} \; ; \; \beta_\perp = \frac{v_\perp}{c} \; ; \; v_\parallel$$

as the axial electron velocity and $\omega_c$ as the cutoff frequency of a waveguide mode. Solving equations (4) and (5) subject to the assumption that $\omega << \omega_c$, and thus neglecting the effects due to finite transverse geometry, one gets $$\omega = (1 + \beta_\parallel)\gamma_\parallel^2 [k_o c \beta_\parallel + \Omega_o/\gamma] \quad (6)$$

or alternately $$\omega = (1 + \beta_\parallel)\gamma^2 (1 + \gamma^2 \beta_\perp^2)^{-1} [k_o c \beta_\parallel + \Omega_o/\gamma] \quad (7)$$

where $$\gamma_\parallel = (1 - \beta_\parallel^2)^{\frac{1}{2}}$$

Equations (6) and (7) show that in the limit of no wiggler field (i.e., $k_o=0$) one recovers the radiation frequency obtained for the cyclotron maser, whereas in the limit $\Omega_o=0$ one has the same frequency as for free electron laser interactions.

The intensity of the radiation grows exponentially with distance along the axis of the device. The growth rate increases with increasing beam current and with increasing wiggler field amplitude. Detailed calculations are given in a paper by W. A. McMullin and G. Bekefi, Physical Review, Volume A25, page 1826 (1982) herein incorporated as reference.

Thus the basic concepts of a novel source of coherent electromagnetic radiation capable of generating (or amplifying) waves in the millimeter and submillimeter wavelength ranges has been described. It employs a longitudinal wiggler magnetic field which has the effect of doubly Doppler upshifting a right circularly polarized electromagnetic wave propagating along the guiding magnetic field.

While the invention has been described in the preferred embodiment described above, it should be understood the words used are words of description instead of words of limitation. It is therefore understood that within the scope of the appended claims, the invention may be practiced otherwise than as specifically described.

What is claimed is:

1. A method for generating continuously tuneable coherent radiation having wavelengths in the millimeter and submillimeter ranges in a longitudinal drift tube comprising the steps of:

generating a relativistic electron beam having a transverse velocity and a longitudinal velocity along the axis of said drift tube;

adiabatically compressing said relativistic electron beam to a paraxial position using a spatially varying solenoid magnetic field along the axial direction in said drift tube;

subjecting said adiabatically compressed relativistic electron beam using a periodic longitudinal magnetic field in an interaction region inside said drift tube under the influence of said solenoidal and said periodic longitudinal magnetic fields and thus generating said electromagnetic radiation moving axially in said drift tube; and extracting said continuously tuneable electromagnetic radiation resulting from said transverse velocity and said longitudinal velocity of the relativistic electron beam along the axis of said longitudinal drift tube at the far end of said longitudinal drift tube.

2. The method of claim 1 wherein the step of extracting said electromagnetic radiation includes the step of collecting the electron beam using a beam collector.

3. The method of claim 2 wherein the frequency of said electromagnetic radiation is varied by varying the transverse and the longitudinal velocity of said relativistic electron beam.

4. The methd of claim 2 wherein the frequency of said electromagnetic radiation is varied by varying the frequency of said periodic longitudinal magnetic field.

5. A source for generating continuously tuneable electromagnetic radiation having wave-lengths in the millimeter and submillimeter ranges which comprises: an evacuated longitudinal drift tube;

means for generating a relativistic beam of electrons having a transverse velocity and longitudinal velocity along the axis of said evacuated longitudinal drift tube;

means for generating a relatively constant magnetic field in an interaction region inside said evacuated drift tube;

means for generating a periodic longitudinal magnetic field along the axis of said evacuated longitudinal drift tube in said interaction region; and means for extracting electromagnetic radiation generated in said interaction region.

6. The source of claim 5 wherein said source further includes means for varying the frequency of electromagnetic radiation generated in said interaction region of said evacuated longitudinal drift tube.

* * * * *